(12) United States Patent
Lin et al.

(10) Patent No.: US 8,970,523 B2
(45) Date of Patent: Mar. 3, 2015

(54) TWO-DIMENSIONAL CAPACITIVE TOUCH PANEL WITH SINGLE SENSOR LAYER

(75) Inventors: Chia-Hsing Lin, Hsinchu (TW); Wen-Jun Hsu, Hsinchu (TW); Yi-Hsin Tao, Hsinchu (TW)

(73) Assignee: Elan Microelectronics Corporation, Hsin Chu (TW)

( * ) Notice: Subject to any disclaimer, the term of this patent is extended or adjusted under 35 U.S.C. 154(b) by 290 days.

(21) Appl. No.: 13/441,428

(22) Filed: Apr. 6, 2012

(65) Prior Publication Data
US 2012/0256877 A1    Oct. 11, 2012

(30) Foreign Application Priority Data

Apr. 8, 2011  (TW) .............................. 100112257 A

(51) Int. Cl.
G06F 3/041    (2006.01)
G06F 3/045    (2006.01)
G06F 3/044    (2006.01)

(52) U.S. Cl.
CPC ...................................... G06F 3/044 (2013.01)
USPC .......................................... 345/173; 345/174

(58) Field of Classification Search
None
See application file for complete search history.

(56) References Cited

U.S. PATENT DOCUMENTS

| 4,771,138 | A | 9/1988 | Dhawan |
| 6,297,811 | B1 * | 10/2001 | Kent et al. ..................... 345/173 |
| 2007/0257894 | A1 * | 11/2007 | Philipp ......................... 345/173 |
| 2007/0279395 | A1 | 12/2007 | Philipp et al. |
| 2009/0283340 | A1 | 11/2009 | Liu et al. |
| 2010/0328259 | A1 | 12/2010 | Ishizaki et al. |
| 2011/0062971 | A1 | 3/2011 | Badaye |

FOREIGN PATENT DOCUMENTS

| CN | 101639750 A | 2/2010 |
| GB | 2 439 614 A | 1/2008 |
| JP | H 11-15591 A | 1/1999 |
| TW | 200846997 A | 12/2008 |
| TW | 201104303 A | 2/2011 |

* cited by examiner

*Primary Examiner* — Alexander Eisen
*Assistant Examiner* — Nan-Ying Yang
(74) *Attorney, Agent, or Firm* — patenttm.us

(57) ABSTRACT

A two-dimensional capacitive touch panel includes three electrodes made from a single sensor layer, with the first one of the electrodes between the other two of the electrodes to establish mutual capacitances between the first electrode and the other two, respectively. The mutual capacitance between the first and second electrodes increases along a direction, and the mutual capacitance between the first and third electrodes decreases along a direction. The first electrode is applied with an excitation signal for sensing variations in the mutual capacitances to calculate a position in the direction that is touched by an external conductor.

6 Claims, 17 Drawing Sheets

TWO-DIMENSIONAL CAPACITIVE TOUCH PANEL WITH SINGLE SENSOR LAYER

FIELD OF THE INVENTION

The present invention is related generally to a capacitive touch panel and, more particularly, to a two-dimensional capacitive touch panel with single sensor layer.

BACKGROUND OF THE INVENTION

Capacitive touch control is established on the detection of capacitance variation at the touch position on a touch sensor. The touch sensor is made of conductor, and thus there is always an insulator formed over the touch sensor as a cover to protect the conductor.

FIG. 1 is a schematic diagram of a capacitive touch device 10 touched by a finger 16, in which the capacitive touch device 10 includes a touch sensor 12 and a cover 14 on the touch sensor 12. Since the touch sensor 12 is made of conductor, there will be a self capacitance Cs established between the touch sensor 12 and ground GND. When the finger 16 contacts the cover 14, since the cover 14 is made of insulator and the human body is a conductor itself and has a potential equal to the ground potential, a coupling capacitance Cp appears between the touch sensor 12 and the finger 16. In this case, the touch sensor 12 and the finger 16 may be regarded as the opposite electrodes of the coupling capacitance Cp, respectively, with the cover 14 as the dielectric of the coupling capacitor Cp. As a result, the coupling capacitance Cp is connected in parallel to the self capacitance Cs of the touch sensor 12, causing the overall self capacitance to increase. Therefore, the finger 16 can be detected by sensing variation in the self capacitance.

In addition to detection of variation in the self capacitance, conventional touch position detection may be alternatively accomplished by detecting variation in the mutual capacitance between two electrodes in a touch sensor. For example, as shown in FIG. 2, a touch sensor includes two sensor electrodes 18 and 20, between which a mutual capacitance is established by lines of the electric field between the sensor electrodes 18 and 20. When a finger 16 approaches the touch sensor, the lines of the electric field between the sensor electrodes 18 and 20 are attracted by the large grounded capacitance of the human body, causing the mutual capacitance between the sensor electrodes 18 and 20 to decrease. Therefore, the finger 16 can be detected by sensing variation in the mutual capacitance.

FIG. 3 is a schematic diagram of a two-dimensional capacitive touch panel with single sensor layer, in which the left drawing shows the layout 21 of the touch sensor in a top view, and the right drawing shows a cross-sectional view of a sensing units 22 along the line A-A in the layout 21. The single sensor layer includes a plurality of sensing units 22, each of which has two sensor electrodes 24 and 26 electrically disconnected with each other, and each of the sensor electrodes 24 and 26 has an area per unit length complementally varying along the X direction in FIG. 3. When a conductor 28, e.g. a finger, contacts the cover 14 on the sensing unit 22, the conductor 28 can be regarded as an electrode to establish two capacitors with the sensor electrodes 24 and 26 respectively, each having a capacitance $$C \propto \frac{\varepsilon \times A}{d}, \quad \text{[Eq-1]}$$

where A represents the area of the conductor 28 overlapping the sensor electrode 24 or 26, and d and $\varepsilon$ represent the thickness and dielectric constant of the cover 14, respectively. As shown by the equation Eq-1, the capacitances established by the conductor 28 and the sensor electrodes 24 and 26 are proportional to the areas of the conductor 28 overlapping the sensor electrodes 24 and 26, respectively. When the conductor 28 touches at the position X1 on the sensing unit 22, the variations $\Delta C1$ and $\Delta C2$ in the self capacitances sensed from the sensor electrodes 24 and 26 by a detector 30 will represent the capacitances established between the conductor 28 and the electrodes 24 and 26, respectively, which are proportional to the areas of the conductor 28 overlapping the sensor electrode 24 or 26, respectively. In addition, since the sensor electrodes 24 and 26 have their areas per unit length complementally varying as they extend in the X direction, the variations $\Delta C1$ and $\Delta C2$ in the self capacitances sensed from the sensor electrodes 24 and 26 are related to the position X1. Thus, by using the variations $\Delta C1$ and $\Delta C2$ in the self capacitances sensed from the sensor electrodes 24 and 26 and the length L of the sensor electrodes 24 and 26, the detector 30 can identify the conductor 28 at the position $$X1 = f(\Delta C1, \Delta C2, L) \approx L \times \frac{\Delta C2}{\Delta C1 + \Delta C2}. \quad \text{[Eq-2]}$$

To identify the position of the conductor 28 in the Y direction in FIG. 3, the detector 30 only has to identify which sensing unit 22 has its self capacitances changed. This is how a single sensor layer can accomplish two-dimensional position detection.

SUMMARY OF THE INVENTION

An objective of the present invention is to provide a two-dimensional capacitive touch panel with single sensor layer.

According to the present invention, a two-dimensional capacitive touch panel includes three electrodes made from a single sensor layer, with the first one of the electrodes between the other two of the electrodes to establish mutual capacitances between the first electrode and the other two, respectively. The mutual capacitance between the first and second electrodes increases along a direction, and the mutual capacitance between the first and third electrodes decreases along a direction. The first electrode is applied with an excitation signal for sensing variations in the mutual capacitances to calculate a position in the direction that is touched by an external conductor.

BRIEF DESCRIPTION OF THE DRAWINGS

These and other objectives, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 4:
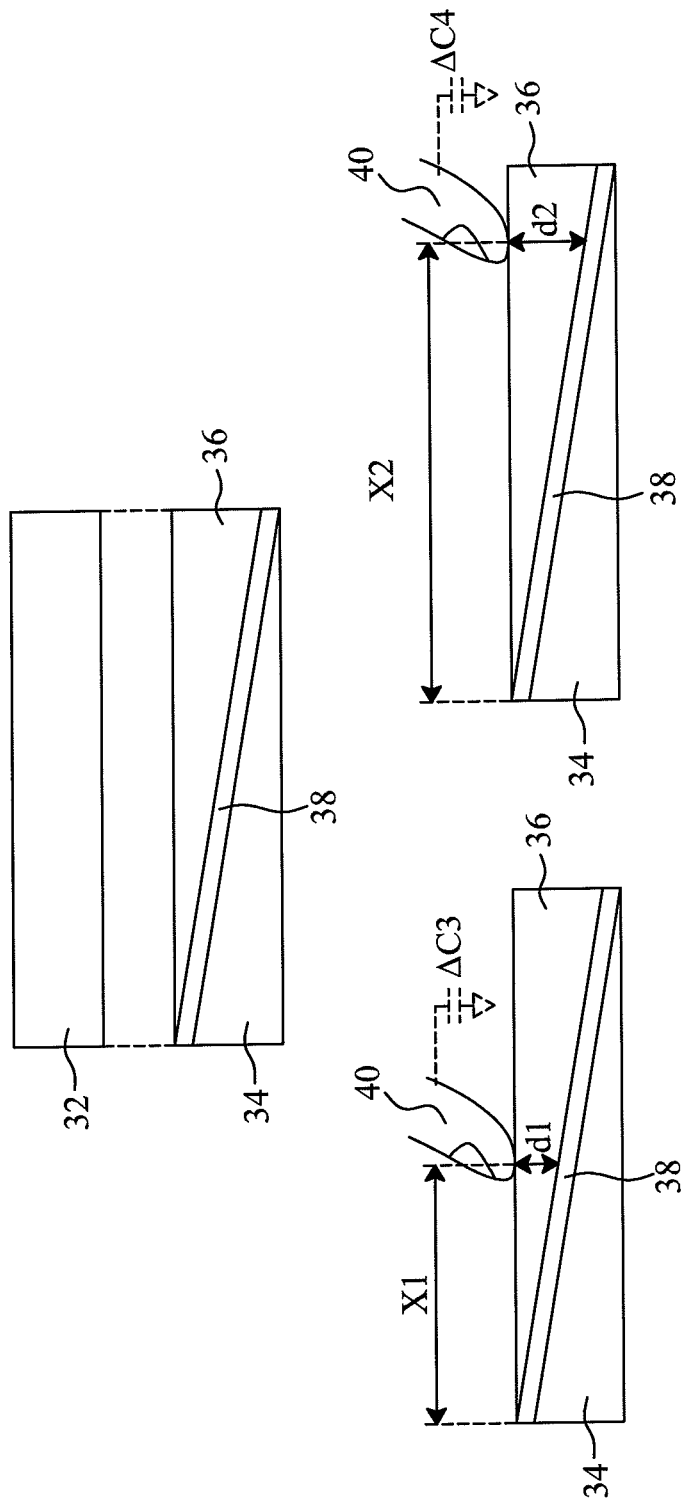
FIG. 4 is a schematic diagram of a first embodiment according to the present invention.

FIG. 4 is a schematic diagram of a first embodiment according to the present invention, in which the upper drawing shows a top view and a cross-sectional view of a sensor trace 32 that has a strip shape in the top view and includes a single sensor electrode 38 sandwiched by wedged substrate 34 and cover 36 such that the single sensor electrode 38 is farther from the touch plane as extending from the left to the right. As shown in the lower drawings, when a conductor, such as a finger 40, contacts the cover 36 at a position X1, the finger 40 is distant from the sensor electrode 38 by a distance d1, and when the finger 40 contacts the cover 36 at another position X2, the finger 40 is distant from the sensor electrode 38 by a distance d2. Assuming that the left end of the sensor trace 32 is the origin in the X direction, the distance d will be proportional to the distance X between the touch position and the origin in the X direction. According to the equation Eq-1, the finger 40 and the sensor electrode 38 establish a capacitance C inversely proportional to the distance d, and the touch position is identified at $$X \propto d \propto \frac{1}{C}. \qquad [\text{Eq-3}]$$

Figure 5:
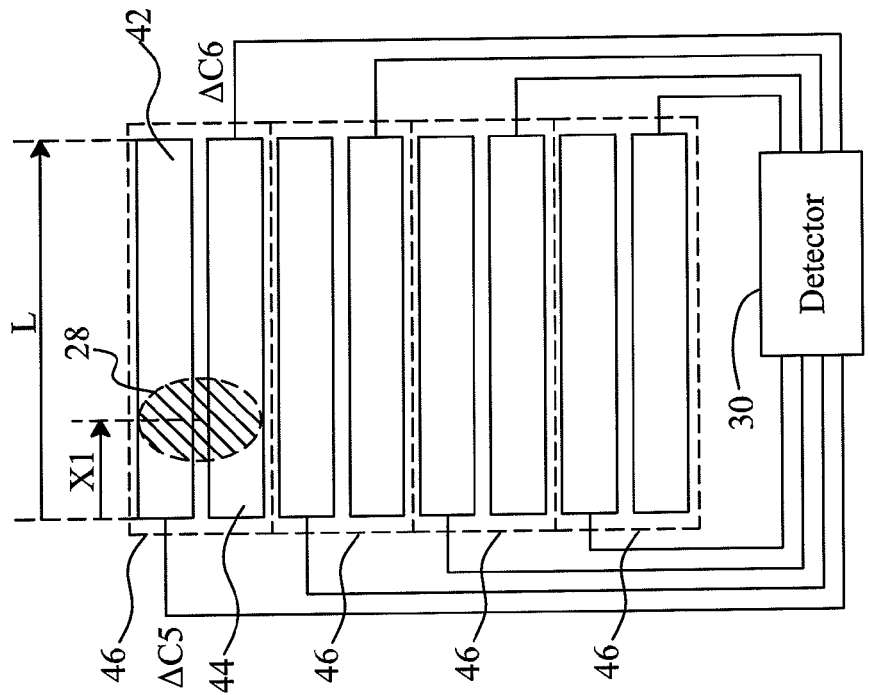
FIG. 5 is a schematic diagram of the embodiment shown in FIG. 4 applied to a two-dimensional capacitive touch panel.
Figure 5:
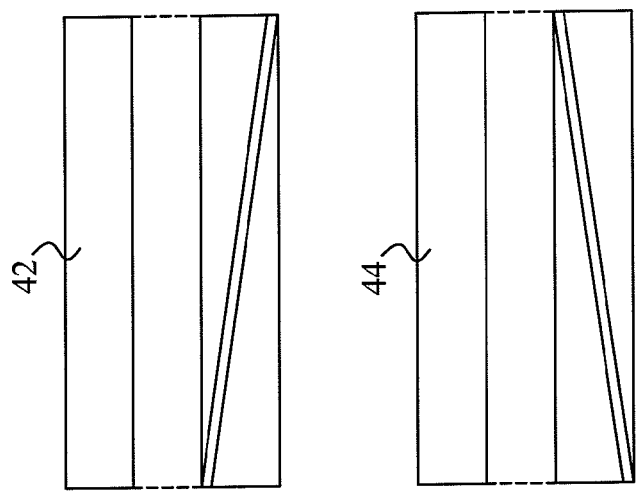

Therefore, the capacitance variation ΔC is inversely proportional to the distance X between the position of the finger 40 and the origin in the X direction. Assuming that the capacitance variations sensed when the finger 40 is at positions X1 and X2 are ΔC3 and ΔC4, respectively, if the sensed capacitance variation ΔC3 is greater than the sensed capacitance variation ΔC4, then it can be easily identified that the position X1 is closer to the origin than the position X2. When the sensor trace shown in FIG. 4 is applied to a two-dimensional touch panel, as shown in the right drawing of FIG. 5, a sensing unit 46 includes two sensor traces 42 and 44. In this embodiment, for more accurate position detection, the sensor traces 42 and 44 are arranged with different inclining directions, as shown in the left drawings of FIG. 5. Multiple sensing units 46 are arranged in parallel in a column to establish a two-dimensional touch sensor. When a conductor 28 contacts a sensing unit 46 at the position X1, according to the principles as shown by FIG. 4 and the equation Eq-3, the variations ΔC5 and ΔC6 in the self capacitances sensed from the sensor traces 42 and 44 by a detector 30 are related to the position X1 in the X direction. Thus, by using the sensed variations ΔC5 and ΔC6 in the self capacitances and the length L of the sensor traces 42 and 44, the position X1 of the conductor 28 in the X direction can be easily calculated.

Figure 6:
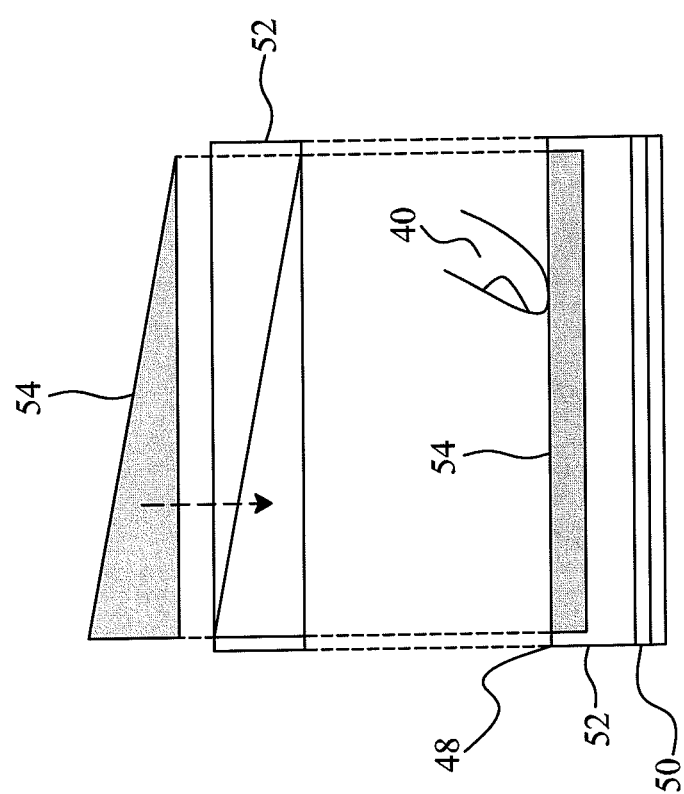
FIG. 6 is a schematic diagram of a second embodiment according to the present invention.

FIG. 6 is a schematic diagram of a second embodiment according to the present invention, in which the upper and lower drawings show a top view and a cross-sectional view of a sensor trace 48 that has a strip shape in the top view and includes a sensor electrode 50 and a combination of two insulators 52 and 54 having different dielectric constants ∈1 and ∈2 as a cover on the sensor electrode 50. The area ratio of the insulators 52 and 54 varies along the X direction to build up an effective dielectric constant ∈ varying with the position in the X direction, i.e. ∈=f(∈1, ∈2, X). For example, in this embodiment, a triangle cutaway is made on the insulator 52 to fill with the insulator 54, as shown in the upper drawing of FIG. 6. According to the equation Eq-1, the position can be identified at $$X \propto \in \propto C. \qquad [\text{Eq-4}]$$

Figure 7:
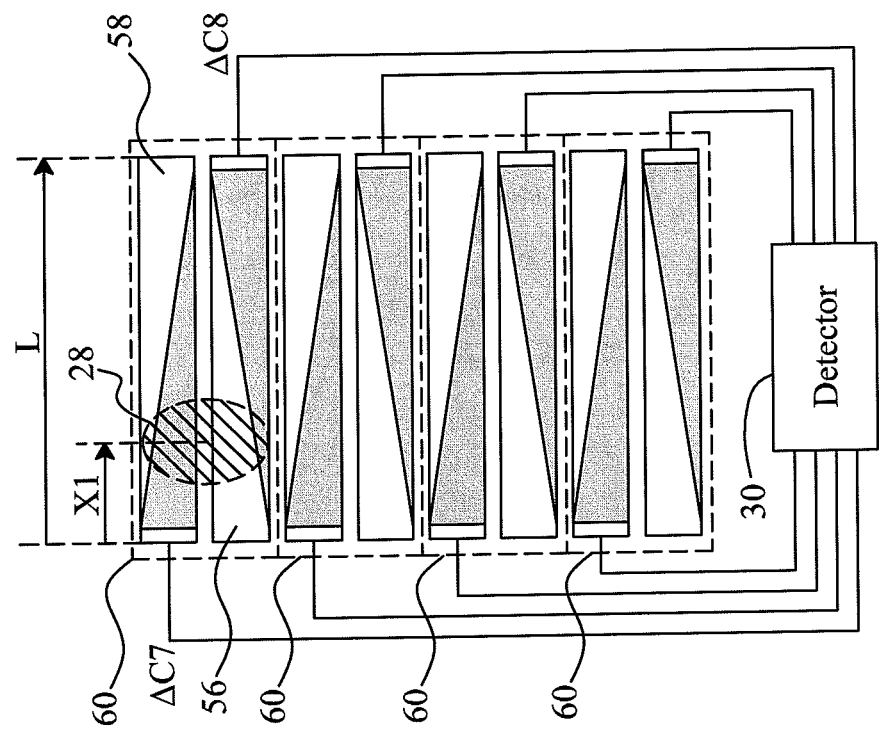
FIG. 7 is a schematic diagram of the embodiment shown in FIG. 6 applied to a two-dimensional capacitive touch panel.

The capacitance established by a finger 40 and the sensor electrode 50 will vary with the effective dielectric constant ∈ or the area ratio between the insulators 52 and 54 at the touch position X. The variation in the self capacitance sensed from the sensor electrode 50 is the capacitance established by the finger 40 and the sensor electrode 50, which is related to the position of the finger 40 in the X direction. When the sensor trace shown in FIG. 6 is applied to a two-dimensional touch panel, as shown in FIG. 7, two sensor traces 56 and 58 establish a sensing unit 60, and for more accurate position detection, the sensor traces 56 and 58 have opposite patterns of the two insulators 52 and 54, i.e. cutaway shapes in opposite directions. Multiple sensing units 60 are arranged in parallel in a column to establish a two-dimensional touch sensor. When a conductor 28 contacts a sensing unit 50 at the position X1, according to the principles as shown by FIG. 6 and the equation Eq-4, the variations ΔC7 and ΔC8 in the self capacitances sensed from the sensor traces 56 and 58 by a detector 30 are related to the position X1 in the X direction. Thus, by using the sensed variations ΔC7 and ΔC8 in the self capacitances and the length L of the sensor traces 56 and 58, the position X1 of the conductor 28 in the X direction can be easily calculated.

Figure 8:
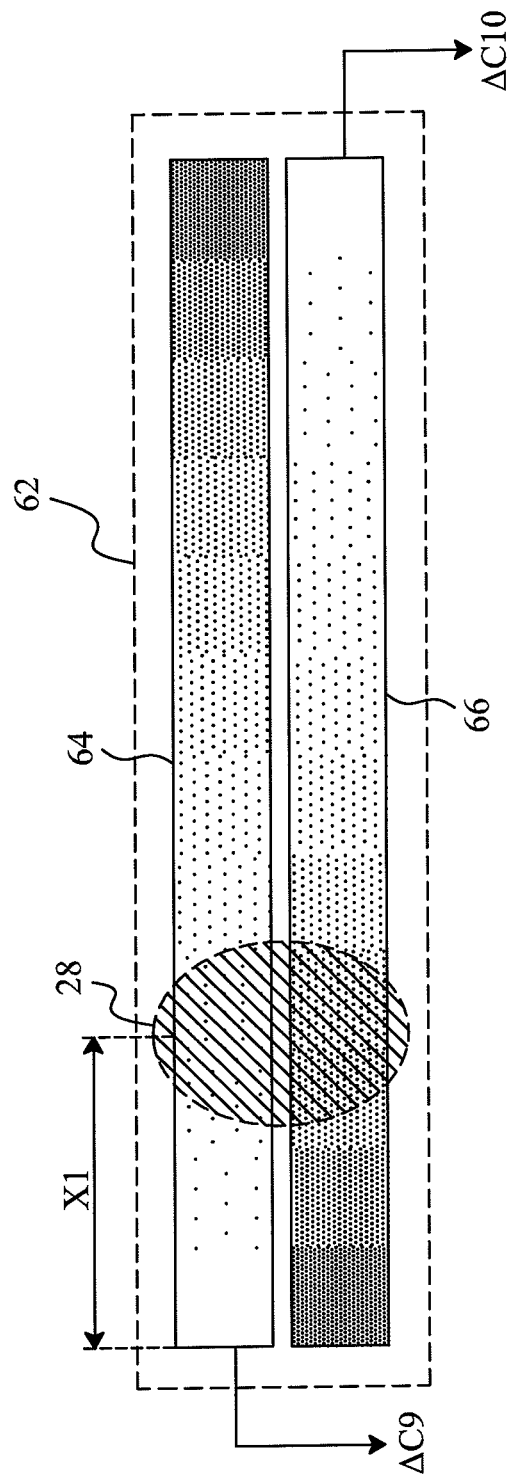
FIG. 8 is a schematic diagram of a third embodiment according to the present invention.

In a third embodiment according to the present invention, as shown in FIG. 8, a sensing unit 62 includes a pair of sensor traces 64 and 66. The sensor trace 64 is covered by a cover formed with trough holes arranged rarer as the cover extends from the right to the left, while a cover covering the sensor trace 66 has trough holes arranged in a pattern opposite to that of the cover on the sensor trace 64. The through holes on the covers of the sensor traces 64 and 66 contain an insulator whose dielectric constant c is different from that of the cover. For example, the insulator contained in the holes may be the air. The density of the through holes determines a ratio between the two insulators. When a conductor 28 contacts the sensing unit 62 at the position X1, according to the principles as shown by FIG. 6 and the equation Eq-4, the variations $\Delta C9$ and $\Delta C10$ in the self capacitances sensed from the sensor traces 64 and 66 are related to the position X1 in the X direction. Thus, by using the sensed variations $\Delta C9$ and $\Delta C10$ in the self capacitances and the length L of the sensor traces 64 and 66, the position X1 of the conductor 28 in the X direction can be easily calculated.

Figure 9:
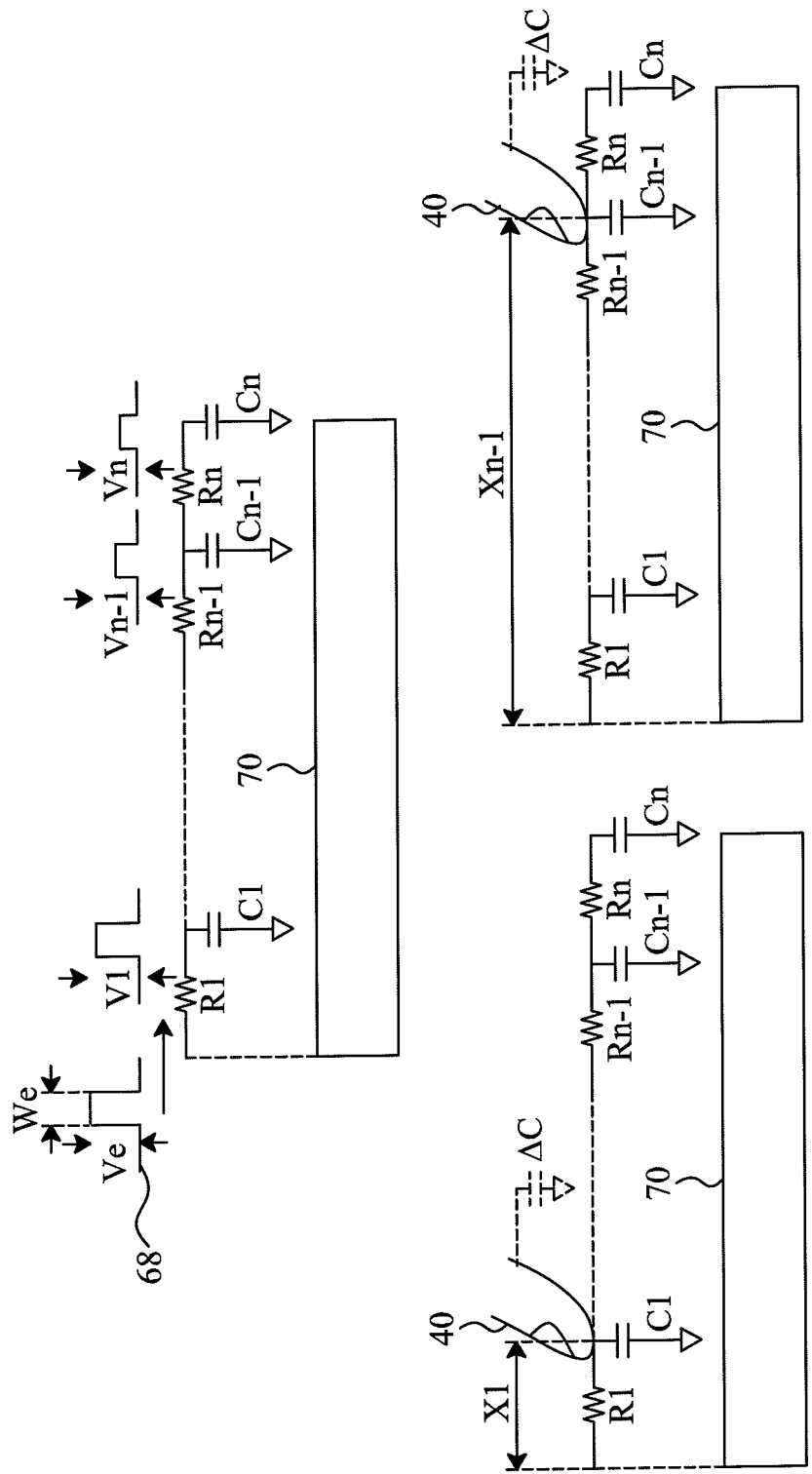
FIG. 9 is a schematic diagram of a fourth embodiment according to the present invention.

FIG. 9 is a schematic diagram of a fourth embodiment according to the present invention, in which a sensor trace 70 has a strip shape in the top view. As shown in the upper drawing of FIG. 9, an excitation signal 68 having a short pulse width We is applied to the sensor electrode 70. The sensor electrode 70 can be regarded as an assembly of numerous RC circuits connected in series, and thus the excitation signal 68 can not charge the entire sensor electrode 70 to the same voltage Ve of the excitation signal 68. Instead, the sensor electrode 70 will be charged to a voltage decayed from left to right, i.e. lower and lower from V1 to Vn, as shown in the upper drawing. As shown in the lower drawings of FIG. 9, when a finger 40 contacts the cover on the sensor electrode 70 at any position, either X1 or Xn−1, the capacitance $\Delta C$ established between the finger 40 and the sensor electrode 70 will remain the same. Although the excitation signal 68 charges the capacitance $\Delta C$ no matter where the contact position of the finger 40 is, the voltage achieved on the capacitance $\Delta C$ is related to the contact position. For example, if the finger 40 is at the position X1, the capacitance $\Delta C$ will be charged to the voltage V1, and if the finger 40 is at the position X1−1, the capacitance $\Delta C$ will be charged to the voltage Vn−1. The capacitance $\Delta C$ is greater than C1, C2, ..., Cn, and thus the voltage of the response signal sensed from the sensor electrode 70 will be related to the position of the finger 40, or $$X \propto \Delta V. \quad [\text{Eq-5}]$$

Figure 10:
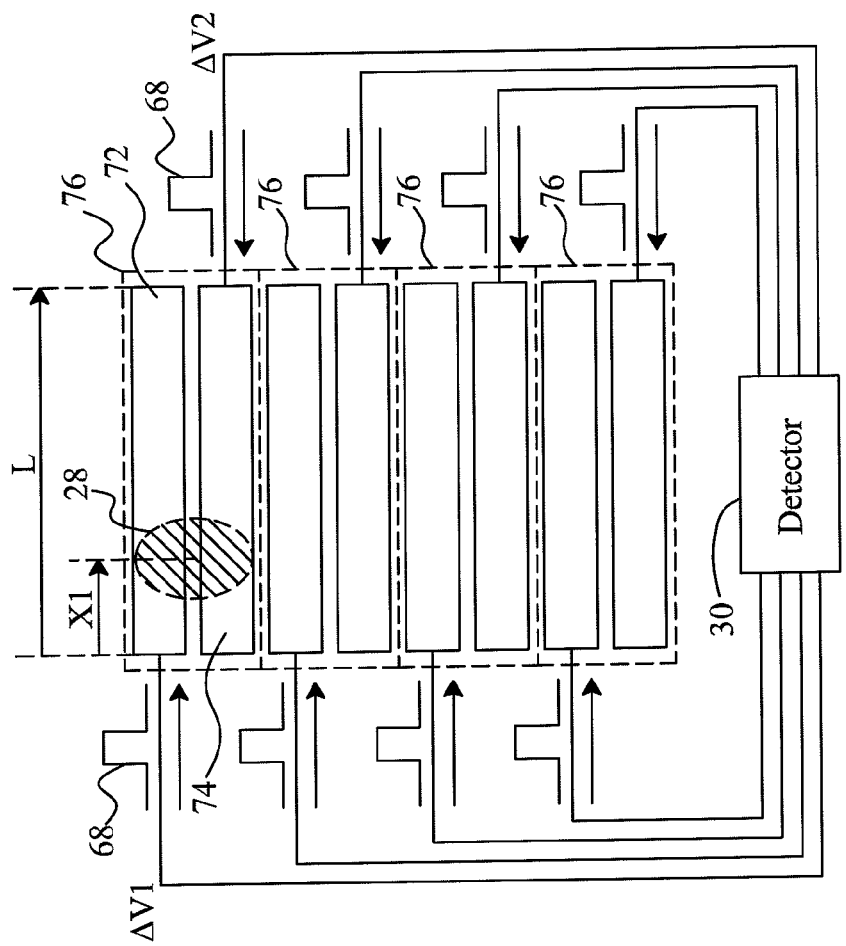
FIG. 10 is a schematic diagram of the embodiment shown in FIG. 9 applied to a two-dimensional capacitive touch panel.

The sensed voltage variation $\Delta V$ is proportional to the position of the finger 40 in the X direction. When the sensor trace shown in FIG. 9 is applied to a two-dimensional touch panel, as shown in FIG. 10, two sensor traces 72 and 74 establish a sensing unit 76, and for more accurate position detection, the sensor traces 72 and 74 are simultaneously applied with the excitation signal 68 from the opposite ends, respectively. Multiple sensing units 76 are arranged in parallel in a column to establish a two-dimensional touch sensor. When a conductor 28 touches a sensing unit 76 at the position X1, according to the principles as shown by FIG. 9 and the equation Eq-5, the voltage variations $\Delta V1$ and $\Delta V2$ sensed from the sensor traces 72 and 74 by a detector 30 are related to the position X1 in the X direction. Thus, by using the sensed voltage variations $\Delta V1$ and $\Delta V2$ and the length L of the sensor traces 72 and 74, the position X1 of the conductor 28 in the X direction can be easily calculated.

Figure 1:
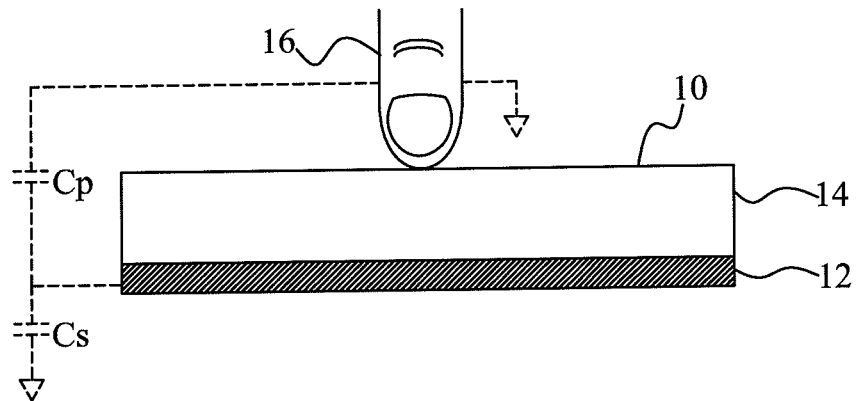
FIG. 1 is a schematic diagram of a capacitive touch device having a variation in a self capacitance caused by a finger thereon.
Figure 2:
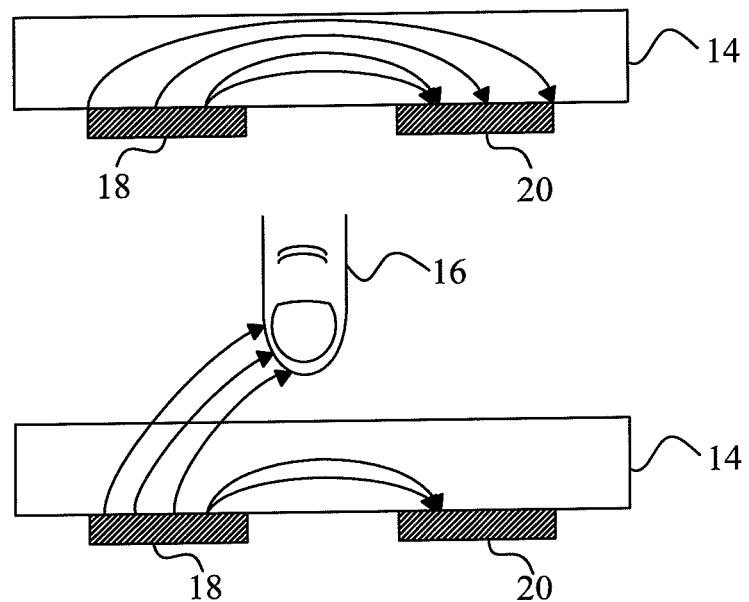
FIG. 2 is a schematic diagram of a capacitive touch device having a variation in a mutual capacitance caused by a finger thereon.
Figure 3:
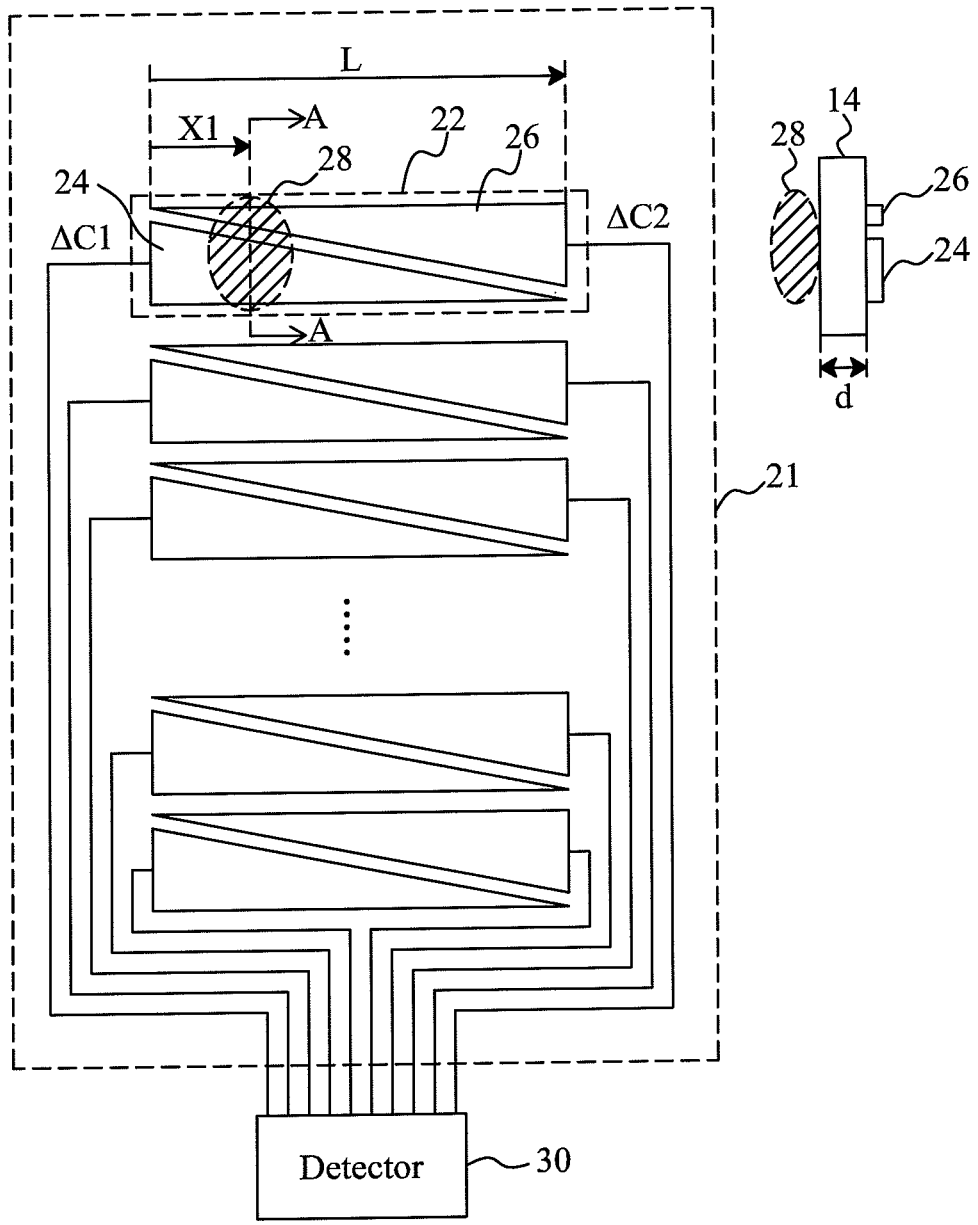
FIG. 3 is a schematic diagram of a conventional two-dimensional capacitive touch panel with single sensor layer.
Figure 11:
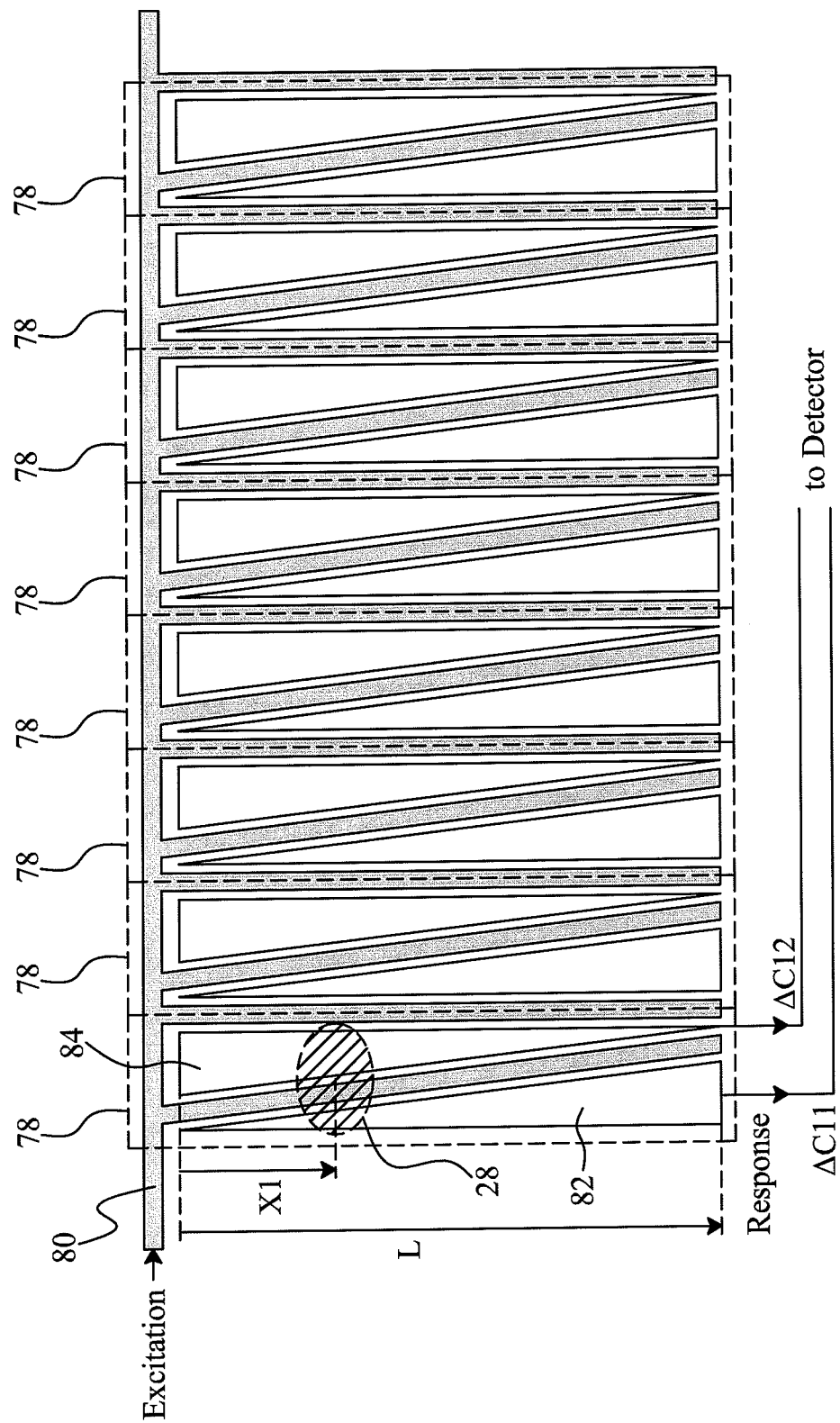
FIG. 11 is a schematic diagram of an embodiment of a two-dimensional capacitive touch panel according to the present invention.

FIG. 11 is a top view of a two-dimensional capacitive touch panel according to the present invention, in which a single sensor layer includes a plurality of sensing units 78, and each sensing unit 78 includes two sensor electrodes 82 and 84 and a portion of an electrode 80 between the sensor electrodes 82 and 84 for acting as an electrode to be excited for sensing mutual capacitances. In touch sensing, it is to sense the variation in the mutual capacitance between the sensor electrode 82 and the electrode 80, and the variation in the mutual capacitance between the sensor electrode 84 and the electrode 80, instead to sense the variations in the self capacitances of the electrodes 82 and 84. When a conductor 28 contacts the cover on the sensor electrodes 82 and 84, the conductor 28 attracts the lines of the electric field between the electrode 80 and the sensor electrodes 82 and 84 as illustrated in FIG. 2, causing the sensed mutual capacitances to decrease. The sensed variations $\Delta C11$ and $\Delta C12$ in the mutual capacitances are related to the areas where the conductor 28 overlaps the sensor electrodes 82 and 84, respectively. In other words, the larger an overlapping area is, the more the lines of the electric field are attracted and the larger a variation in the mutual capacitance is. As shown in FIG. 11, the conductor 28 overlaps the sensor electrode 84 more than it overlaps the other sensor electrode 82, so the variation $\Delta C12$ in the mutual capacitance is greater than the variation $\Delta C11$ in the mutual capacitance. Moreover, each of the sensor electrodes 82 and 84 in this embodiment is an acute triangle, with its area per unit length varying along the X direction, so the variations $\Delta C11$ and $\Delta C12$ in mutual capacitances sensed from the sensor electrodes 82 and 84 are related to the position X1 of the conductor 28 in the X direction. Therefore, according to the sensed variations $\Delta C11$ and $\Delta C12$ in mutual capacitances and the length L of the sensor electrodes 82 and 84, the position X1 of the conductor 28 in the X direction can be easily calculated.

Figure 12:
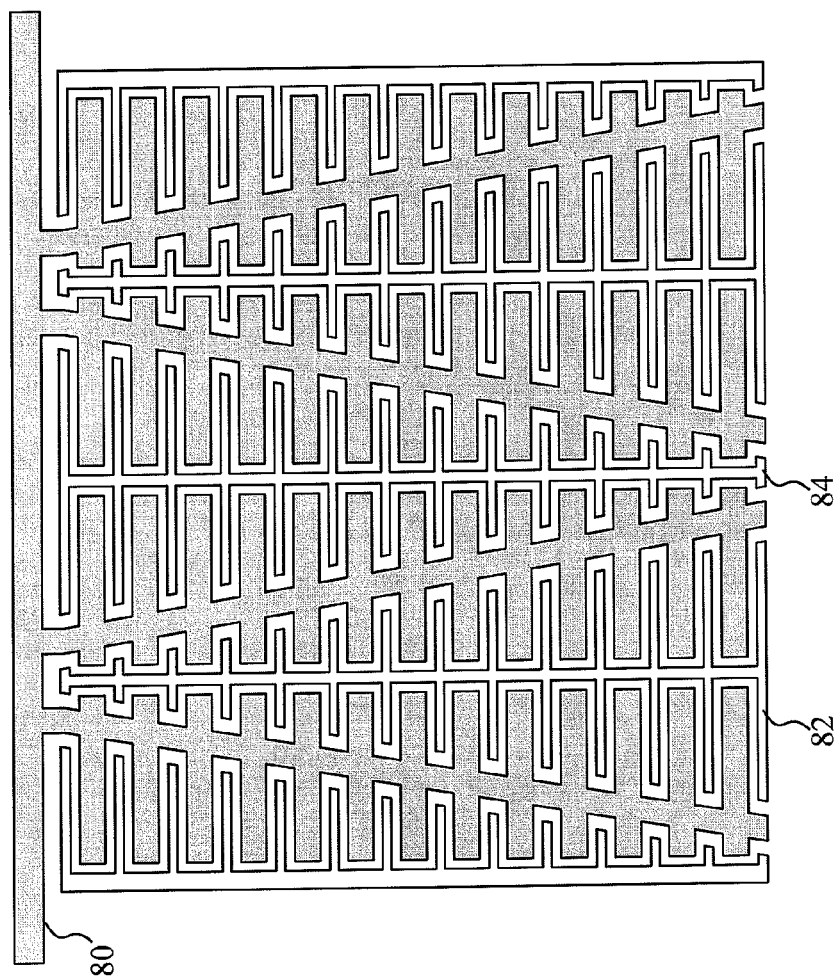
FIG. 12 is a schematic diagram of an embodiment where the electrodes of FIG. 11 are arranged into a fishbone-shaped pattern.
Figure 13:
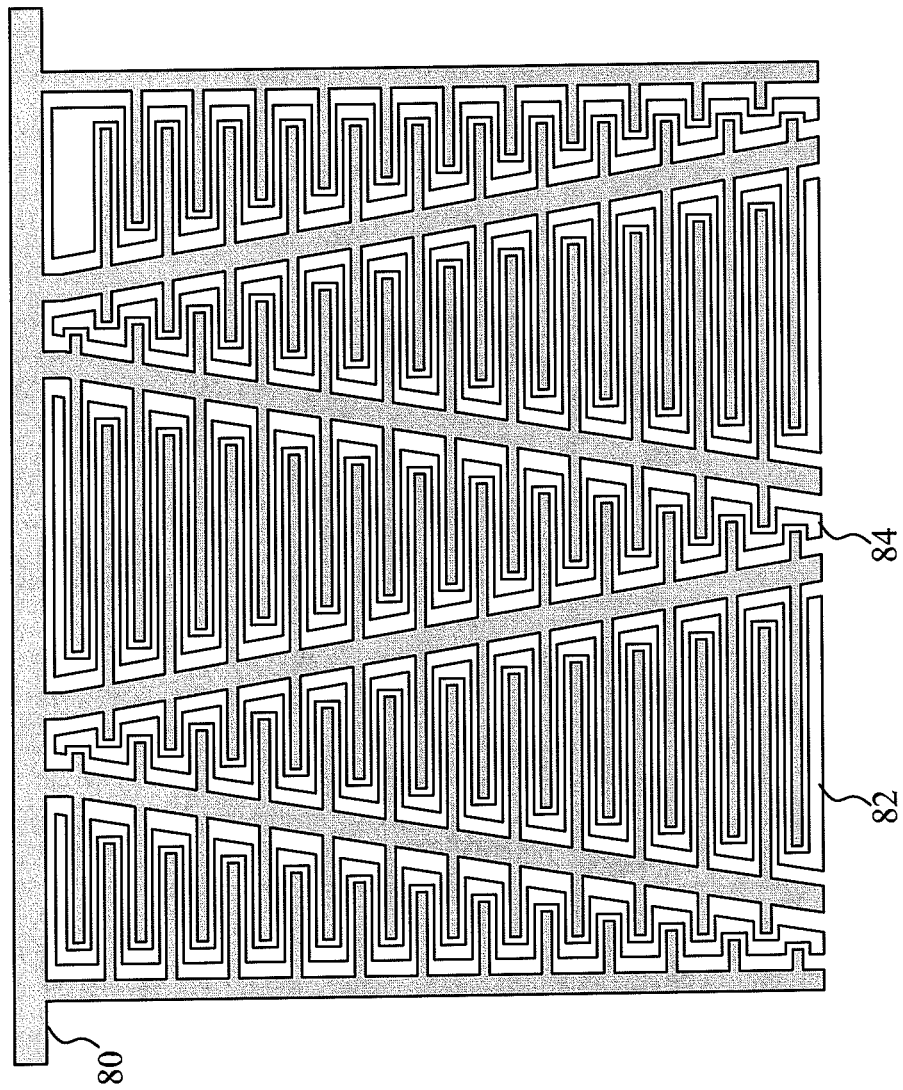
FIG. 13 is a schematic diagram of an embodiment where the electrodes of FIG. 11 are arranged into an S-shaped pattern.

To increase the mutual capacitances between the sensor electrodes 82 and 84 and the electrode 80, respectively, in other embodiments, the borders between the sensor electrodes 82 and 84 and the electrode 80, respectively, are enlarged. For example, the sensor electrodes 82 and 84 may be arranged into a fishbone pattern as shown in FIG. 12, or may be arranged into an S-like pattern as shown in FIG. 13, with the electrode 80 similarly located between the sensor electrodes 82 and 84, so that the borders between the electrode 80 and the sensor electrodes 82 and 84, respectively, are increased to increase the mutual capacitances thereof, thereby improving the sensitivity.

Figure 14:
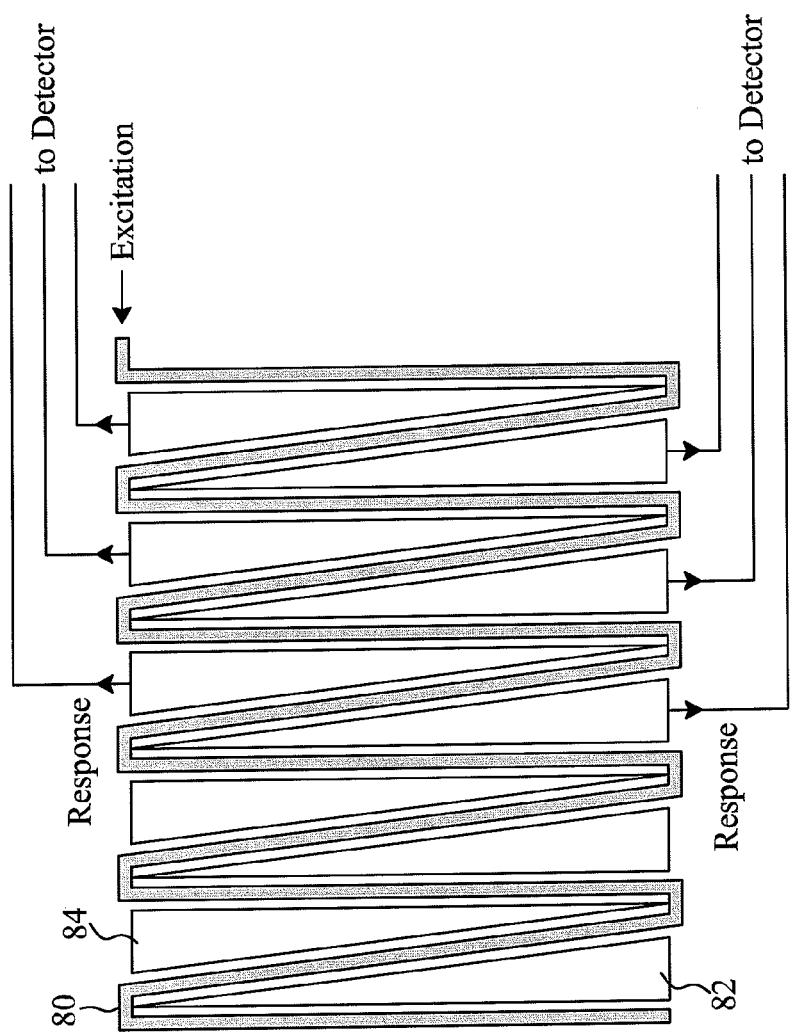
FIG. 14 is a schematic diagram of an embodiment of a two-dimensional capacitive touch panel according to the present invention.
Figure 15:
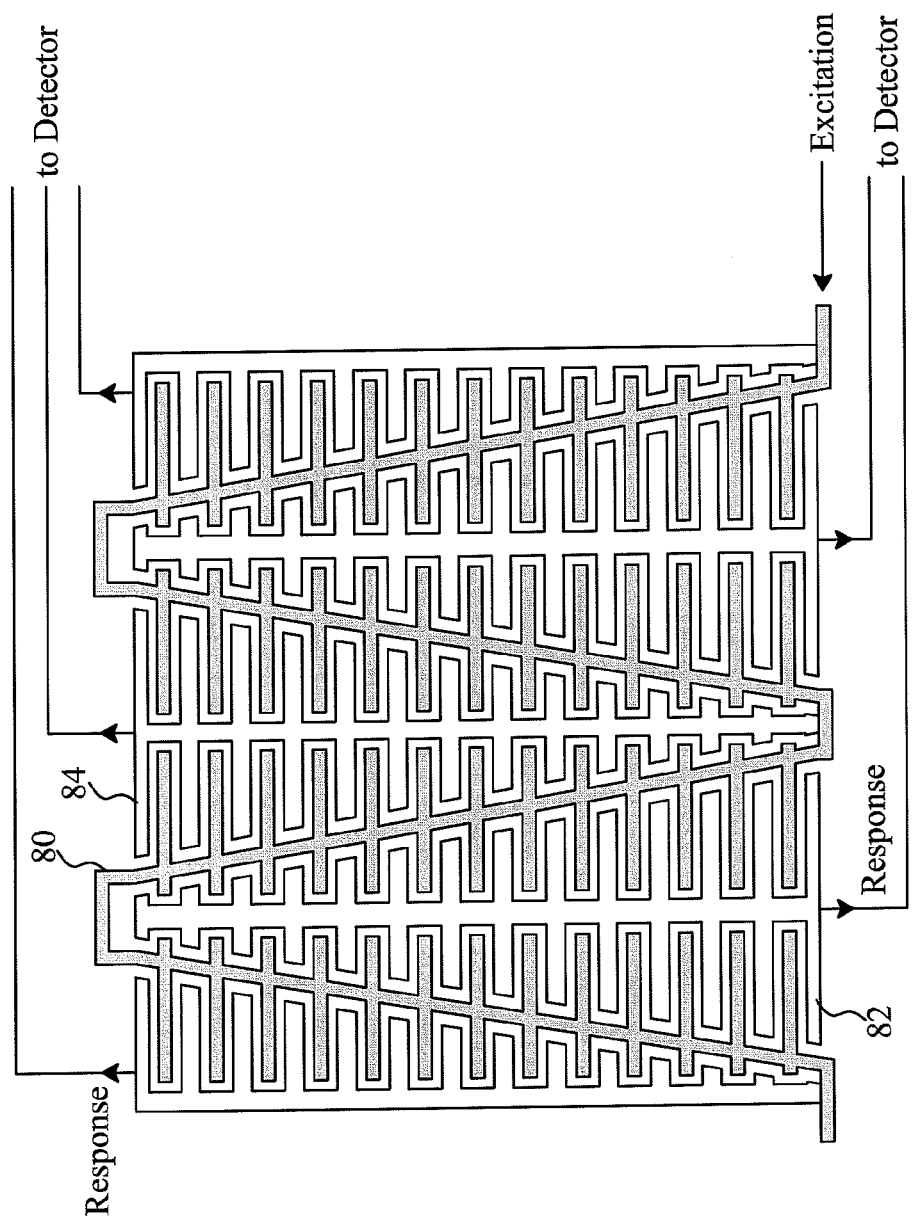
FIG. 15 is a schematic diagram of an embodiment where the electrodes of FIG. 14 are arranged into a fishbone-shaped pattern.
Figure 16:
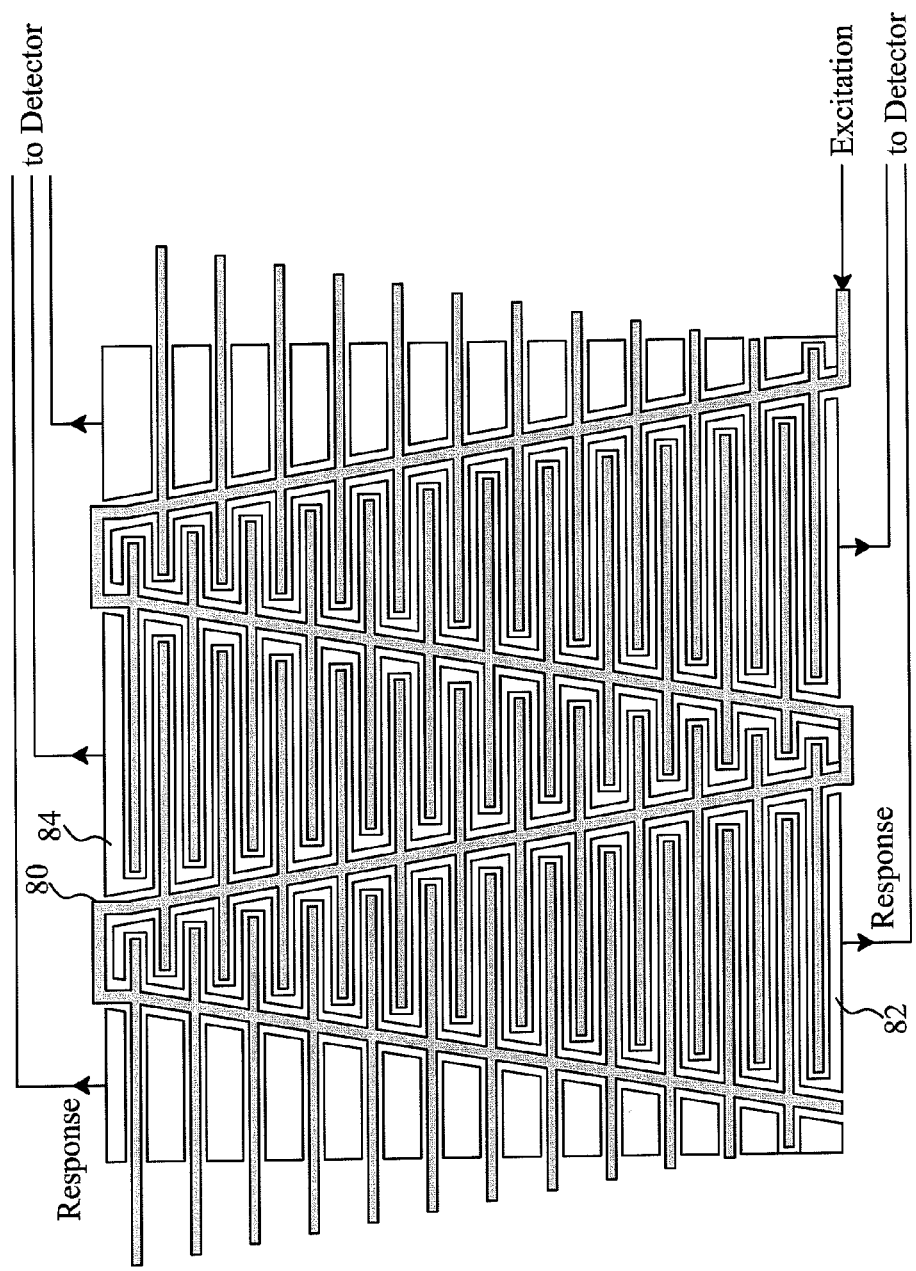
FIG. 16 is a schematic diagram of an embodiment where the electrodes of FIG. 14 are arranged into an S-shaped pattern.

FIG. 14 provides one more embodiment similar to that of FIG. 11, except that the electrode 80 has a different layout for easier wiring. FIGS. 15 and 16 are also embodiments wherein the electrodes 80 shown in FIGS. 12 and 13 are modified to be in the similar connection manner to that shown in FIG. 14.

Figure 17:
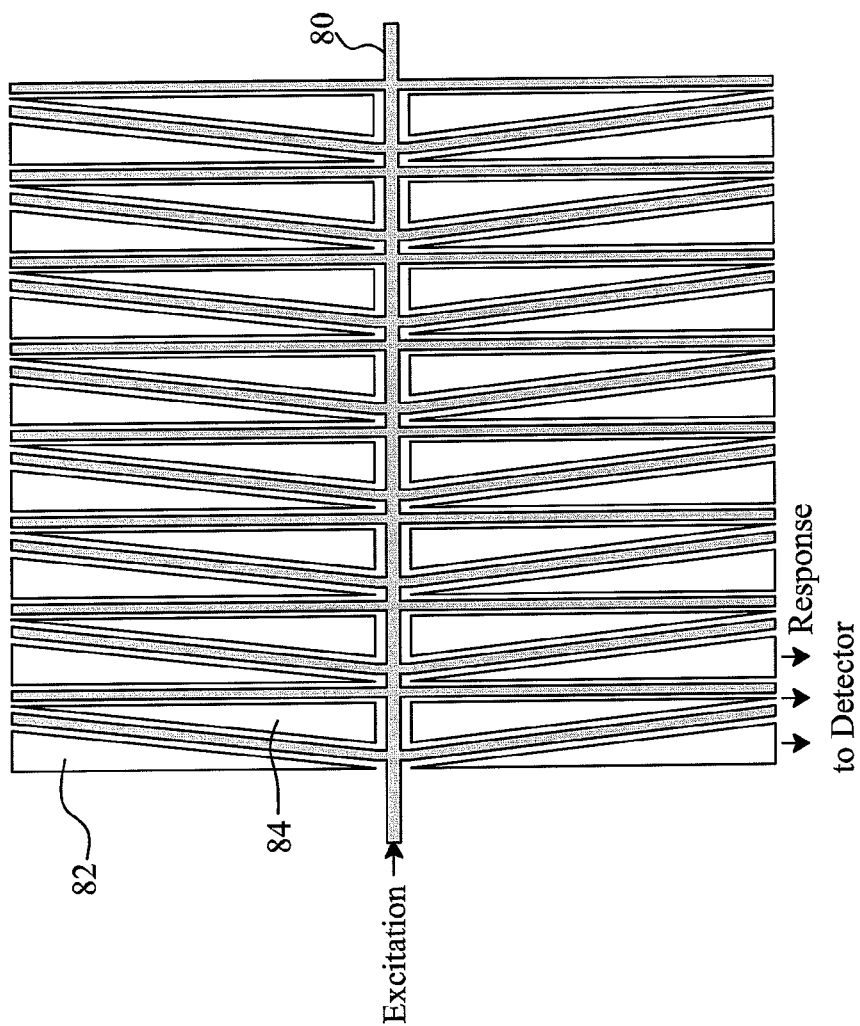
FIG. 17 is a top view of a large touch panel using the embodiment shown in FIG. 11.

FIG. 17 is a top view of a large touch panel according to the present invention. In consideration of accurate position detection, the sensor electrodes 82 and 84 are limited in length, and thus are arranged into two rows, with the electrode 80 similarly located between the sensor electrodes 82 and 84.

Figure 18:
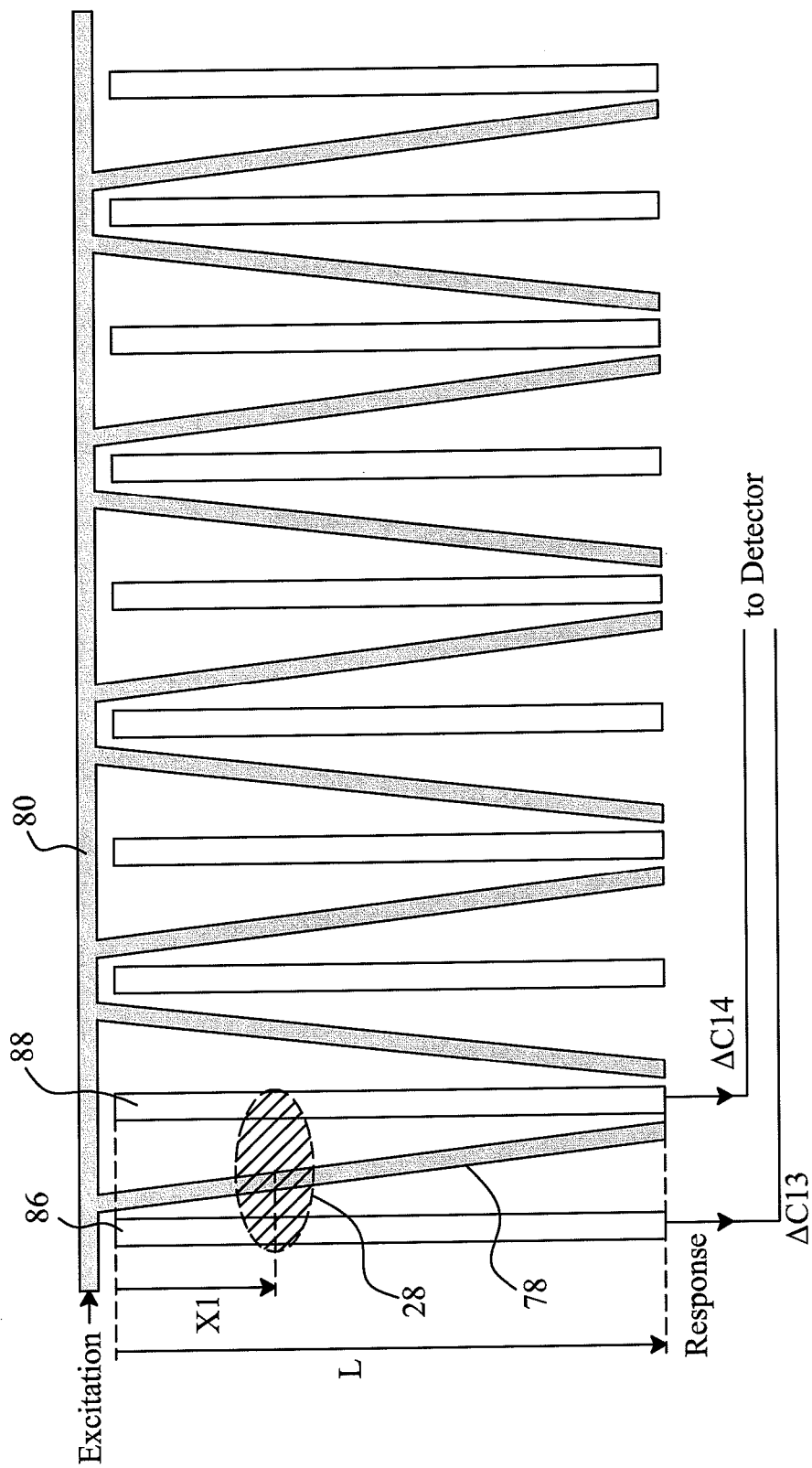
FIG. 18 is a schematic diagram of an embodiment of a two-dimensional capacitive touch panel according to the present invention.

FIG. 18 is a schematic diagram of a further embodiment of a two-dimensional capacitive touch panel according to the present invention, in which a single sensor layer is provided with an electrode 80 for excitation, while the sensor electrodes 86 and 88 are separate strips with the electrode 80 obliquely extending therebetween, so that the distance between each of the sensor electrodes 86 and 88 and the electrode 80 varies along the X direction. The farther the sensor electrode 86 or 88 is away from the electrode 80, the fewer the lines of electric field therebetween will be, and the smaller the variation ΔC13 or ΔC14 in the mutual capacitance caused by the conductor 28 is. As shown in FIG. 18, at the contact point X1, the sensor electrode 88 is farther away from the electrode 80 than the other sensor electrode 86, so the sensed variation ΔC13 will be smaller than the sensed variation ΔC14. Therefore, according to the variations ΔC13 and ΔC14 in the mutual capacitances sensed from the sensor electrodes 86 and 88 and the length L of the sensor electrodes 86 and 88, the position X1 of the conductor 28 in the X direction can be easily calculated.

In the above embodiments, the electrode 80 is uniform distributed over the touch panel, so it has a large area and in turn a large self capacitance to ground, resulting in higher sensitivity in sensing variation in the self capacitance. Therefore, when a conductor approaches any position on the touch panel, the impact of the conductor on the self capacitance of the electrode 80 can be readily sensed. The present invention thus can further provide good proximity sensing by sensing the variation in the self capacitance of the electrode 80, without using any additional detector.

In another embodiment, the interconnection of the portions of the electrode 80 for different sensing units is alternatively implemented by a circuit outside the touch panel. Preferably, the external circuit excites the electrode 80 at where the position detection is to be performed, so as to save power consumed by the excitation.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A two-dimensional capacitive touch panel with a single sensor layer, the touch panel comprising:
    a first electrode made from the single sensor layer and having a configuration formed by plural interconnected first and second branches; and
    a plurality of sensing units, wherein each sensing unit comprises:
        a second electrode made from the single sensor layer, positioned at a first side of a corresponding first branch of the first electrode, for sensing a first mutual capacitance established between the first electrode and the second electrode; and
        a third electrode made from the single sensor layer, positioned at a second side of the same corresponding first branch of the first electrode, for sensing a second mutual capacitance established between the first electrode and the third electrode;
    wherein, each of the second branches is positioned between two corresponding adjacent sensing units, the second electrodes are connected to multiple first traces respectively, the third electrodes are connected to multiple second traces respectively, an excitation signal is applied to the first electrode and simultaneously transmitted to the interconnected branches when sensing the first and second mutual capacitances, and the first and second mutual capacitances respectively received from the multiple first and second electrodes through corresponding first and second traces are used to calculate a position on which the touch panel is contacted by an external conductor.

2. The touch panel of claim 1, wherein each second electrode has an area per unit length gradually increased along a first direction, and each third electrode has an area per unit length gradually decreased along the first direction.

3. The touch panel of claim 2, wherein each of the second and third electrodes has an acute triangle shape in a top view of the single sensor layer.

4. The touch panel of claim 2, wherein the second and third electrodes of each sensing unit have a gap therebetween, and one of the interconnected branches of the first electrode extends in the gap.

5. The touch panel of claim 1, wherein the second electrode is farther away from the first electrode along a first direction, and the third electrode is closer to the first electrode along the first direction.

6. The touch panel of claim 1, wherein the first electrode is uniformly distributed over the touch panel and provides a self-capacitance for proximity sensing.

* * * * *